United States Patent [19]

Anikin et al.

[11] 4,238,288
[45] Dec. 9, 1980

[54] DRIVE OF NUCLEAR REACTOR S CONTROL ELEMENT

[76] Inventors: Alexandr A. Anikin, ulitsa Very Slutskoi, 32, kv. 192, Leningradskaya oblast, Kolpino; Vladimir G. But, ulitsa Sofiiskaya, 55, kv. 263, Leningrad; Vladimir P. Nikolaev, ulitsa Proletarskaya, 58, kv. 91; Anatoly A. Silvanovich, ulitsa Vokzalnaya, 12, kv. 7, both of Leningradskaya oblast, Kolpino, all of U.S.S.R.

[21] Appl. No.: 908,923

[22] Filed: May 24, 1978

[51] Int. Cl.² .................................................. G21C 7/08
[52] U.S. Cl. .................................................. 176/36 R
[58] Field of Search ............... 176/36 R, 36 C; 74/25; 310/80, 191

[56] References Cited

U.S. PATENT DOCUMENTS

| 3,215,608 | 11/1965 | Guenther | 176/85 |
| 3,356,874 | 12/1967 | Chiapparelli | 310/80 |
| 3,599,498 | 8/1971 | Misenti | 74/25 |
| 3,627,634 | 12/1971 | Guenther et al. | 176/85 |
| 3,714,479 | 1/1973 | Moore et al. | 310/80 |
| 3,939,039 | 2/1976 | Seki et al. | 176/87 |
| 3,992,255 | 11/1976 | DeWesse | 176/36 C |

FOREIGN PATENT DOCUMENTS

| 2547918 | 5/1976 | Fed. Rep. of Germany | 176/36 R |
| 389602 | 11/1973 | U.S.S.R. | 310/80 |

Primary Examiner—Samuel W. Engle
Assistant Examiner—S. A. Cangialosi
Attorney, Agent, or Firm—Fleit & Jacobson

[57] ABSTRACT

According to the invention, the drive of a nuclear reactor's control element comprises an electromotor having a stator and a rotor composed lengthwise of two parts whose total length is equal to that of the active part of the stator. One part of the rotor is a solid cylinder-shaped member. The other part of the rotor comprises at least three double-arm rocking levers, the pivot axes of which are parallel to the axis of a drive screw. One arm of each of said levers is a rotor pole. The other arm of each of said levers carries a roller, the axis of rotation of which is parallel to the axis of the drive screw. Said rollers make up a detachable roller nut which interacts with the drive screw under the action of an electromagnetic field.

1 Claim, 4 Drawing Figures

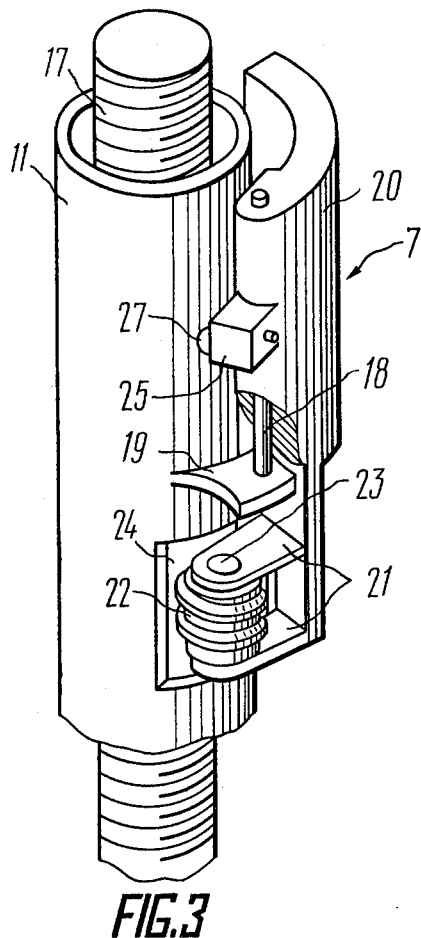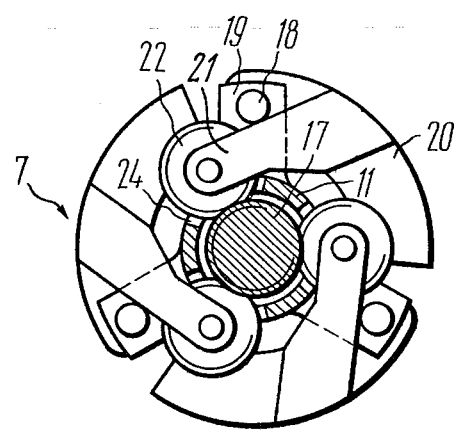
FIG.2
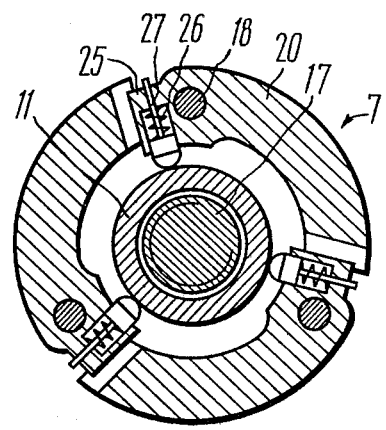
FIG.3
FIG.4

DRIVE OF NUCLEAR REACTOR S CONTROL ELEMENT

FIELD OF THE INVENTION

The present invention relates to nuclear reactors and, more particularly, to a drive of a nuclear reactor's control element, comprising a screw-roller nut kinematic pair.

The invention is readily applicable to actuating mechanisms incorporated in control and protection systems of water-moderated water-cooled and boiling reactors.

BACKGROUND OF THE INVENTION

There is known a drive of a nuclear reactor's control element (cf. U.S. Pat. No. 3,714,479, Cl. 310-80), comprising a screw-roller nut pair. The nut is rotated by an airtight electromotor whose rotor is installed in bearings floating in the axial direction. The axis of rotation of the nut's rollers, which are arranged in the lower part of the rotor, is parallel to the axis of displacement of the drive screw coupled to the control element. If the control element or the drive screw gets jammed, the rotor is driven vertically by the axial force until the braking lugs are matched with respective grooves provided in the motor's housing. As a result, the rotation of the braked rotor and, consequently, of the nut is discontinued, whereby an increase in the axial load upon the control element is avoided.

The design of the drive under review is such that it takes much time to drop the control element by an emergency protection signal. This is due to the fact that the nut's rollers are always engaged with the drive screw. In addition, the floating bearings make the drive's kinematics too complicated and reduce its overall reliability.

The foregoing disadvantages are partially eliminated in a drive of a nuclear reactor's control element (cf. U.S. Pat. No. 3,599,498, Cl. 74-25), comprising an electromotor and a special electromagnet with swinging armatures and rollers. The armatures are spring-loaded and spaced around a hollow shaft which is an extension of the rotor. By an emergency protection signal, the electromagnet is de-energized and the rollers are disengaged from the drive screw.

In the drive under review, the electromagnet's armatures are mounted on horizontal pivot axles and thus spaced around the hollow shaft; this accounts for an increased size of the drive. The use of the special electromagnet accounts for a great amount of metal put into the manufacture of the drive, as well as for a complicated power supply circuit.

The above disadvantages are eliminated in a drive of a nuclear reactor's control element, comprising an electromotor with a stator and a separable rotor having double-arm rocking levers and rollers that make up a detachable roller nut interacting with a drive screw under the action of the stator's electromagnetic field (cf. The Shippingport Pressurized Water Reactor, Addison-Wesley Publishing Company, Inc., Reading, Mass., USA, 1958).

In this drive, the electromotor's rotor is made separable across the diameter, and is composed of two double-arm rocking levers mounted on horizontally extending axles. The first arms of the levers make up the rotor, as such; each of the levers' second arms carries two rollers of a detachable nut. In the working position, the axis of rotation of the detachable nut's rollers is at an angle to the axis of the drive screw, which is equal to the helix angle of the drive screw. When the electromotor is deenergized, the first arms of the rocking levers, which make up the rotor, are brought together and rotated about their horizontal axles through an angle at which the rollers, mounted on the second arms, are disengaged from the drive screw. As a result, the control element, which is coupled to the drive screw, is introduced under gravity into the reactor's core. When the electromotor is energized, the first arms of the rocking levers, which make up the rotor, are brought apart by electromagnetic forces, whereupon the rollers of the nut engage with the drive screw and set it into forward motion.

Making the rotor of the drive under review separable across the diameter necessitates an increase in the internal diameter at the location of the detachable roller nut, as well as an increase in the height of the drive. The fact that the rotor is separable across the diameter also affects the electromagnetic characteristics of the electromotor. An engagement between the rollers and the lugs of the drive screw reduces the starting torque of the electromotor and the operating speed of the roller nut.

SUMMARY OF THE INVENTION

It is an object of the present invention to provide a small-size drive of a nuclear reactor's control element.

It is another object of the invention to provide a drive of a nuclear reactor's control element, wherein the electromotor has a stable torque in all operating conditions.

It is still another object of the invention to provide a reliable drive of a nuclear reactor's control element.

The foregoing and other objects of the present invention are attained by providing a drive of a nuclear reactor's control element, comprising an electromotor with a stator and a composite rotor containing double-arm rocking levers and rollers making up a detachable roller nut interacting with a drive screw under the action of the stator's electromagnetic field, which drive is characterized, according to the invention, in that the rotor is composed lengthwise of two parts, one of which is a solid cylinder-shaped member, whereas the other comprises at least three double-arm rocking levers, the pivot axes of which are parallel to the axis of the drive screw, first arms of said levers acting as rotor poles, while their second arms carry the rollers of the detachable roller nut, the axes of rotation of said rollers being parallel to the axis of the drive screw, the total length of the two parts of the rotor being equal to the length of the active part of the stator.

The proposed design of a drive of a nuclear reactor's control element accounts for a drive of small dimensions, which is simple to control and reliable in operation. The proposed design further accounts for stable operating characteristics of the drive's electromotor in all operating conditions.

BRIEF DESCRIPTION OF THE ACCOMPANYING DRAWINGS

Other objects and advantages of the present invention will become more apparent from the following detailed description of a preferred embodiment thereof to be read in conjunction with the accompanying drawings.

A better understanding of the present invention will be had from a consideration of the following detailed description of a preferred embodiment thereof, taken in conjunction with the accompanying drawings, wherein:

FIG. 2 is a magnified sectional view taken on line II—II of FIG. 1;

FIG. 3 is an axonometric view of a double-arm rocking lever in accordance with the invention;

FIG. 4 is a magnified sectional view taken on line IV—IV of FIG. 1.

DETAILED DESCRIPTION OF THE INVENTION

Figure 1:
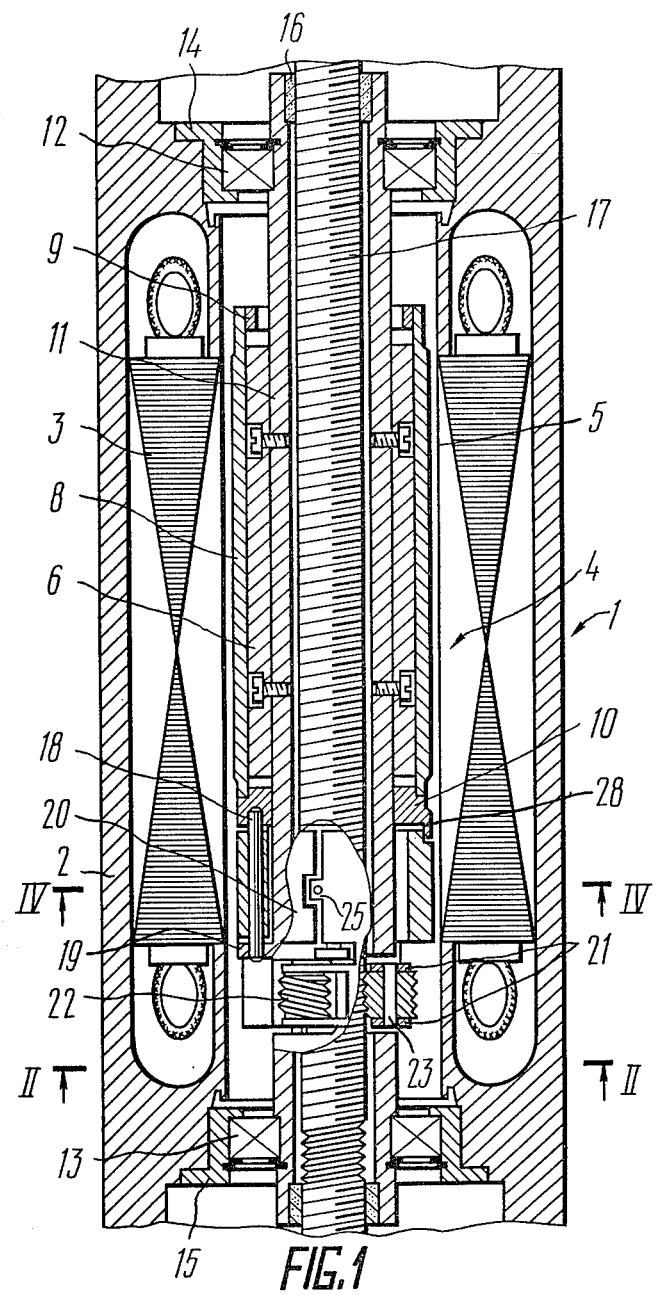
FIG. 1 is an elevation view of a drive of a nuclear reactor's control element, according to the invention.

According to the invention, the drive of a nuclear reactor's control element comprises an electromotor 1 (FIG. 1) having a housing 2 which accommodates a stator 3 and a composite rotor 4.

The stator 3 is insulated from the reactor's coolant by a shield 5.

Lengthwise, the rotor 4 is composed of two parts whose total length is equal to the length of the active part of the stator 3. One part of the rotor 4 is a solid cylinder-shaped member 6, whereas the other comprises three double-arm rocking levers 7 (FIG. 2).

Mounted on the outer surface of the solid cylindrical member 6 (FIG. 1) of the rotor 4 are rods 8, each having one of its ends secured in a ring 9, whereas their other ends are secured in a ring 10 mounted on a spindle 11 rotatable in bearings 12 and 13. The bearings 12 and 13 are arranged in housings 14 and 15, respectively, which, in turn, are accommodated in the housing 2 of the electromotor 1. Arranged inside the spindle 11 are centering bushings 16 through which there extends a drive screw 17 coupled to a control element (not shown).

The rods 8 and rings 9 and 10 make up a grid for starting the electromotor 1.

Pivot axles 18 (FIG. 3) of the double-arm levers 7 are parallel to the axis of the drive screw 17. One end of each of the pivot axles 18 is secured in the ring 10 (FIG. 1), whereas the opposite end is secured in a lug 19 (FIG. 3) provided in the spindle 11. First arms 20 of the double-arm rocking levers 7 act as poles of the rotor 4 (FIG. 1). Second arms 21 (FIG. 3) of the levers 7 are forked and carry rollers 22 whose rotation axles 23 are secured in the forks so that they are parallel to the axis of the drive screw 17. The rollers 22 (FIG. 2) form a detachable roller nut interacting with the drive screw 17 through apertures 24 provided in the spindle 11 due to the action of the electromagnetic field of the stator 3 (FIG. 1) upon the double-arm levers 7.

Each arm 20 (FIG. 3) of the double-arm levers 7 has a lug 25 which accommodates a spring 26 (FIG. 4) intended to actuate a stop 27.

The extent of displacement of the arm 20 (FIG. 3) of the double-arm lever 7 is limited by a stop 28 provided on the ring 10 (FIG. 1).

The present invention has been described herein with reference to a preferred embodiment of a drive of a nuclear reactor's control element, wherein the rotor contains three double-arm rocking levers. It is apparent, however, that use can be made of a greater number of levers without altering the spirit of the invention.

The operating principle of the proposed drive of a nuclear reactor's control element is as follows.

As supply voltage is fed to the stator 3 (FIG. 1) of the electromotor 1, the resultant electromagnetic field interacts with the solid cylinder-shaped member 6 and rotates the composite rotor 4.

At the same time the electromagnetic field of the stator 3 interacts with the arms 20 (FIG. 2) of the double-arm rocking levers 7 and pivots them in the radial direction about the axles 18; as a result, the rollers 22 of the detachable roller nut engage with the drive screw 17 which drives the control element.

As the stator 3 (FIG. 1) of the electromotor 1 is deenergized, the double-arm rocking levers 7 (FIG. 2) are pivoted in the opposite direction by the stop 27 (FIG. 4) and the spring 26, whereby the rollers 22 (FIG. 2) are disengaged from the drive screw 17, and the control element is dropped under gravity by an emergency protection signal.

By altering the sequence of connection of the supply voltage phases, one can change the direction of rotation of the rotor 4 (FIG. 1) and, consequently, the direction of motion of the drive screw 177 and the control element.

Whenever it is necessary to stop the control element and keep it at any desired level, d.c. voltage is applied to the stator of the electromotor.

The proposed drive of a nuclear reactor's control element is of a small size and simple to control; at the same time it guarantees a stable and failsafe operation of the reactor's control and protection system.

While preferred forms and arrangements have been shown in illustrating the invention, it is to be clearly understood that various changes in detail and arrangement may be made without departing from the spirit and scope of this disclosure.

What is claimed is:

1. A drive for driving a control element of a nuclear reactor having a coolant contained therein, said drive comprising:

an electromotor having a housing and having a supply voltage applied thereto;

said electromotor including a stator accommodated in said housing, insulated from the coolant of said nuclear reactor, and producing an electromagnetic field as said supply voltage is applied to said electromotor, said stator including an active part of given length;

said electromotor further including a rotor also accommodated in said housing so that said stator encompasses said rotor with a certain clearance between them, said rotor comprising two lengthwise parts, a first part and a second part, the total length of said two parts being equal to the given length of the active part of said stator;

securing means for securing said rotor in said housing;

the first part of said rotor comprising a solid cylinder-shaped member secured in said housing by said securing means;

a drive screw having a shaft extending inside said solid cylinder-shaped member, said drive screw being coupled to said control element;

the second part of said rotor comprising at least three double-arm rocking levers, each having a first arm, a second arm and a pivot axle coupled to and intermediate said first arm and said second arm;

said first arm, said second arm and said pivot axle being parallel to said shaft of said drive screw and secured in said housing by said securing means, the first arm of each said lever acting as a pole of said rotor; and rollers, one for each double-arm rocking lever, each said roller having an axle of rotation and mounted on corresponding said second arm of said each double-arm rocking lever so that said axle of rotation is parallel to said shaft of said drive screw, each said roller comprising detachable roller nut means rotatably mounted with axis parallel to said shaft of said drive screw for interacting with said drive screw under the action of said electromagnetic field of said stator.

* * * * *